United States Patent [19]
Gioutsos et al.

[11] Patent Number: 5,519,613
[45] Date of Patent: May 21, 1996

[54] SYSTEM AND METHOD FOR DISCRIMINATING SHORT-PERIOD CRASHES

[75] Inventors: Tony Gioutsos, Brighton; Daniel N. Tabar, Troy; Edward J. Gillis, South Lyon, all of Mich.

[73] Assignee: Automotive Systems Laboratory, Inc., Farmington Hills, Mich.

[21] Appl. No.: 319,308

[22] Filed: Oct. 6, 1994

[51] Int. Cl.⁶ .................................................. B60R 21/32
[52] U.S. Cl. ................... 364/424.05; 340/436; 307/10.1; 280/735; 180/282
[58] Field of Search ............... 364/424.05; 340/436, 340/669; 307/10.1; 280/734, 735; 180/274, 282

[56] References Cited

U.S. PATENT DOCUMENTS

| | | | |
|---|---|---|---|
| 4,020,453 | 4/1977 | Spies et al. | 340/52 H |
| 4,381,829 | 5/1983 | Montaron | 180/274 |
| 4,410,875 | 10/1983 | Spies et al. | 280/735 |
| 4,497,025 | 1/1985 | Hannoyer | 364/424.05 |
| 4,975,850 | 12/1990 | Diller | 364/424.05 |
| 4,984,651 | 1/1991 | Grosch et al. | 180/268 |
| 4,985,835 | 1/1991 | Sterler et al. | 364/424.05 |
| 5,038,134 | 8/1991 | Kondo et al. | 340/438 |
| 5,040,118 | 8/1991 | Diller | 364/424.05 |
| 5,067,745 | 11/1991 | Yoshikawa | 280/735 |
| 5,068,793 | 11/1991 | Conde et al. | 364/424.05 |
| 5,073,860 | 12/1991 | Blackburn et al. | 364/424.05 |
| 5,081,587 | 1/1992 | Okano | 364/424.05 |
| 5,083,276 | 1/1992 | Okano et al. | 364/424.05 |
| 5,229,943 | 7/1993 | Eigler et al. | 364/424.05 |
| 5,256,904 | 10/1993 | Tohbaru | 307/10.1 |
| 5,309,138 | 5/1994 | Tohbaru | 340/436 |
| 5,337,238 | 8/1994 | Gioutsos et al. | 364/424.05 |
| 5,339,242 | 8/1994 | Reid et al. | 364/424.05 |
| 5,363,302 | 11/1994 | Allen et al. | 364/424.05 |

*Primary Examiner*—Kevin J. Teska
*Assistant Examiner*—Tyrone V. Walker
*Attorney, Agent, or Firm*—Lyman R. Lyon

[57] ABSTRACT

In a system (10) and method for controlling actuation of a vehicle passenger safety device in response to an event possibly requiring actuation of the safety device, a differential measure ($m_1(t)$) is generated based on stored consecutive values for received vehicle acceleration information while a measure ($m_2(t)$) correlated with the relative progress of the event is generated by selectively providing as an input to a first accumulator (24) either a weighted transitory value for received acceleration information ($a(t)$) whenever the transitory value is itself less than or equal to a first predetermined threshold value ($x_1$), or a weighted alternative value, wherein the alternative value is itself equal to twice the first predetermined threshold value ($x_1$) minus the transitory value. The differential measure ($m_1(t)$) is thereafter combined with the progress measure ($m_2(t)$) to effectively "damp" or weight the former as a function of event progress, whereupon the resulting combination is accumulated in a second accumulator (30) to obtain a measure ($m_3(t)$) predictive of event severity, with the safety device being actuated when the predictive measure ($m_3(t)$) exceeds a second predetermined threshold value ($x_2$).

16 Claims, 1 Drawing Sheet

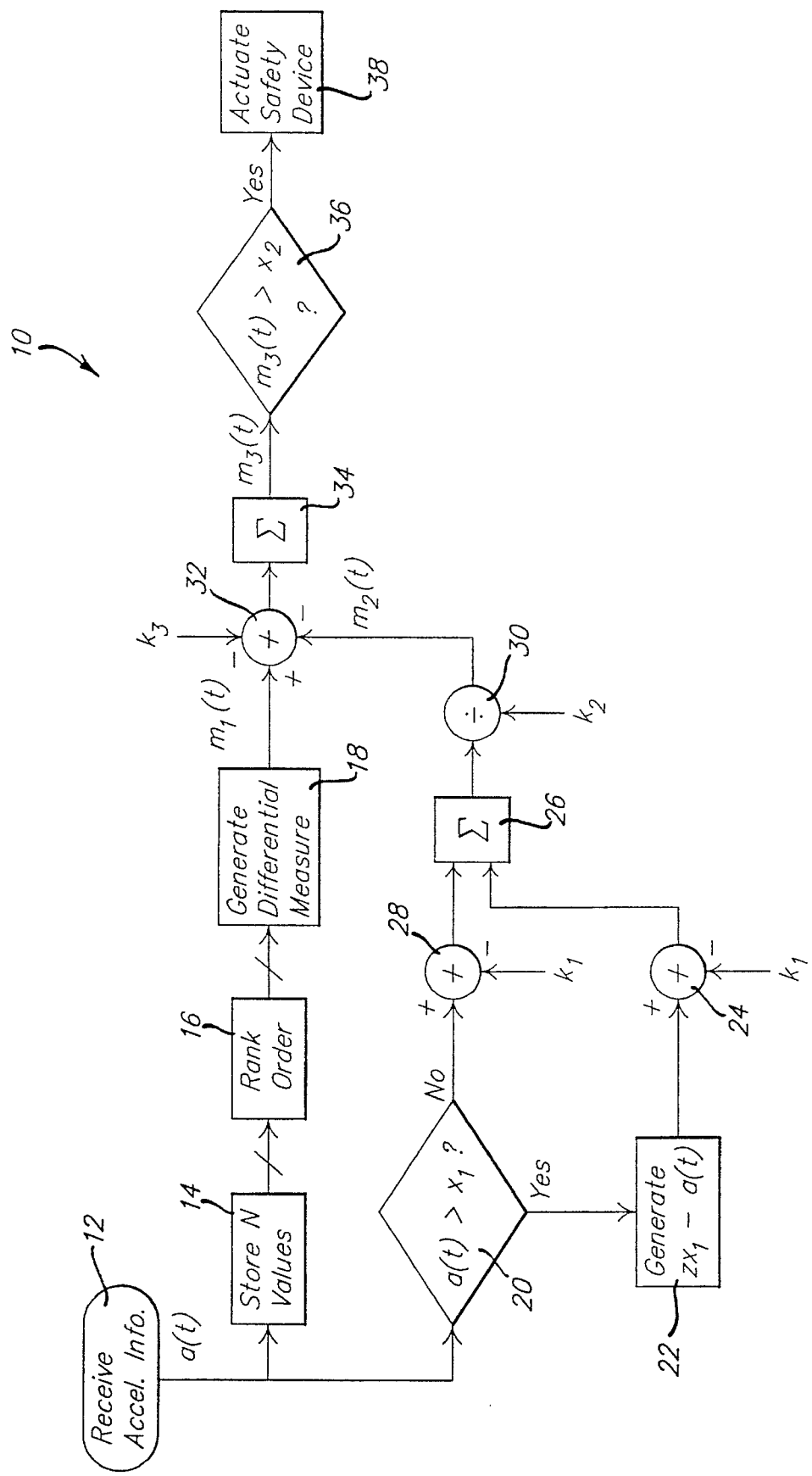

SYSTEM AND METHOD FOR DISCRIMINATING SHORT-PERIOD CRASHES

BACKGROUND OF THE INVENTION

The instant invention relates to systems and methods for triggering the deployment or actuation of vehicular safety devices and, more particularly, to a prediction-based system and method which anticipates conditions requiring such deployment or actuation to provide superior response to crash scenarios or "events" of relatively short duration, as might be experienced with a vehicle of frame-chassis construction.

A variety of systems for actuating vehicular safety devices are well known in the art. Such systems are used to sense a crash condition and, in response to such a condition, to actuate an air bag, or lock a seat belt, or actuate a pretensioner for a seat belt retractor. Typically, the safety device is actuated or deployed into its protective position when an impact exceeding a predetermined magnitude is detected by the actuating system.

Alternatively, copending U.S. patent application Ser. No. 07/773,017 teaches a prediction-based system and method for crash discrimination which utilizes a modified velocity term as an event-based timer when predicting future acceleration as the product of a jerk estimate multiplied by event-based time. In this manner, present acceleration information is extrapolated into the future so as to predict when a severe crash is in the making—this, in contrast with other known methods of crash detection, each of which relies upon a certain change in one or more physical quantities (such as estimated vehicle velocity or jerk), perhaps while varying corresponding threshold values over (arbitrary) time to converge to a solution.

In a similar vein, U.S. Pat. No. 5,337,238 teaches a system and method for crash discrimination which features the "damping" of each physical measure upon which crash discrimination, preferably using a damping factor which itself varies as a function of the progress of a crash, i.e., is a function of event-based time. This damping feature effectively provides for the gradual introduction an/or removal of various crash measures from the overall discrimination algorithm.

However, where the crash event is one characterized as having a relatively-short period, as is typical of vehicles having a frame-chassis construction, the modified velocity term used as an event-based timer in U.S. patent application Ser. No. 07/773,017 and in U.S. Pat. No. 5,337,238 will react too slowly, given that a decision as to whether to actuate the safety device must be made in a shorter absolute period of time, based upon a smaller data sample (given the shorter period within which to gather such data). For example, the mid-point of a typical "no-fire" event, i.e., the point of maximal acceleration (deceleration), might be reached after perhaps about forty milliseconds in a frame-chassis vehicle, whereas a like event might produce an acceleration peak after perhaps about sixty or seventy milliseconds in a unibody vehicle. Moreover, since the entire crash pulse is of much shorter duration with a frame-chassis vehicle, and since the amount of energy to be dissipated during the event is the same in both instances (the energy dissipated being equal to the area under the plot of acceleration-versus-time curve), it will be appreciated that the magnitude of acceleration experience by the frame-chassis vehicle is much greater than that of the unibody vehicle.

Accordingly, what is needed is a prediction-based crash discriminator featuring a novel event-based timer with which the crash discriminator can appropriately respond to the shorter-duration crash pulse (with its attendant reduction in the volume of acceleration information available for its use) while managing the higher-magnitude acceleration information generated thereby.

SUMMARY OF THE INVENTION

It is an object of the instant invention to provide a prediction-based system and method for crash detection suitable for use in discriminating short-period crashes.

Another object of the instant invention is to provide a prediction-based system and method for controlling actuation of a vehicle passenger safety device in the event of a short-period crash, as might be generated by virtue of a frame/chassis vehicle construction.

Another object of the instant invention is to provide a system and method for detecting short-period crash conditions or "events" wherein significant measures are damped, i.e., whose values are modified, as a function of the progress of the event being analyzed therewith.

Under the invention, in an improved system and method for controlling actuation of a vehicle passenger safety device in response to an event possibly requiring actuation of the device, wherein a measure predictive of event severity is itself generated from a measure evaluative of received vehicle acceleration information in relation to time and a measure correlated with the relative progress of the event being analyzed, the progress measure is generated by selectively providing as an input to a first accumulator either a transitory value for the received information when the transitory value is less than or equal to a predetermined threshold value, or an alternative value equal to twice the predetermined threshold value minus the transitory value when the transitory value itself exceeds the predetermined threshold value. The thus-selectively provided value is also preferably weighted prior to being input to the accumulator as by subtracting a constant weighting factor therefrom in a summing junction, whereby the selectively-provided inputs to the accumulator become negative in the absence of substantive transitory values for vehicle acceleration, thereby likewise tending to reduce the progress measure to zero in the absence of such substantive transitory acceleration values.

Thus, under the invention, a preferred system for controlling actuation of a vehicle passenger safety device in response to an event possibly requiring actuation of the device includes a means for generating a measure which is evaluative of the received vehicle acceleration information in relation to time, such as vehicle jerk or acceleration variance information; and a means responsive to the received information for generating a measure correlated with the progress of the event by selectively providing as an input to a first accumulator either a weighted transitory value for the received information when the transitory value is less than or equal to a first predetermined threshold value, or a similarly weighted alternative value itself equal to twice the first predetermined threshold value minus the transitory value when the transitory value itself exceeds the first predetermined threshold value. The evaluative measure output by the first accumulator is thereafter "damped" through combination with the progress measure prior to its accumulation in a second accumulator to obtain a measure predictive of crash severity. The predictive measure is thereafter compared to a second predetermined threshold value in a comparing means, whereupon the comparing means generates an output signal to actuate the safety device when and if the predictive measure exceeds the second predetermined threshold value.

Thus, it may be said that the system and method of the invention use an event-based timer or progress measure when generating values predictive of the severity of an event and, hence, when identifying events likely to require actuation of a vehicle passenger safety device, thereby providing an event-based crash discriminator which operates without time-based start-up criteria, i.e., without having to detect the time-based beginning of any given event. And, in the preferred embodiment, the progress measure is specifically employed as an event-based "damping" or weighting factor tending to increasingly emphasize or deemphasize transitory values for a differential measure prior to its accumulation based upon the progress of the event being analyzed.

BRIEF DESCRIPTION OF THE DRAWING

The drawing is a diagrammatic schematic of an exemplary system for controlling actuation of a vehicle passenger safety device in accordance with the invention.

DETAILED DESCRIPTION OF THE PREFERRED EMBODIMENT(S)

Referring to the drawing, in an exemplary system 10 for controlling actuation of a vehicle passenger safety device (not shown) in accordance with the invention, digital information representative of instantaneous vehicle acceleration is received at block 12 (the receipt of which may itself involve generation of an analog signal with an acceleration sensor, the filtering of the analog signal through an anti-aliasing filter, and the conversion of the analog signal into digital information in an analog-to-digital converter, all not shown). The received information a(t) representative of instantaneous vehicle acceleration is thereafter stored in a storage means of length N at block 14 to provide N consecutive stored values.

The resulting data set is divided in half, with the most recent half sent to a pair of rank-order filters indicated generally at block 16. The first of the two rank-order filters thereafter outputs three acceleration values from the most recent or "current" half of the stored data set: the highest-ranked current acceleration value; the median-ranked current acceleration value; and the lowest-ranked current acceleration value. The second of the two rank-order filters similarly outputs three acceleration values based upon the older half or "past" values of the stored data set: the highest-ranked past acceleration value; the median-ranked past acceleration value; and the lowest-ranked past acceleration value. The rank-order filters remove any wild variance data, such as high-frequency noise, EMI, or spiky crash data, while retaining significant "edge data," i.e., data relating to a slant-up or a step function useful for generating a differential measure $m_1(t)$ which is itself evaluative of the received vehicle acceleration information in relation to time.

More specifically, the outputs from the rank-order filters are used to calculate modified jerk or modified variance values at block 18 in the manner taught in copending U.S. patent application Ser. No. 08/298,843 filed on Aug. 31, 1994, entitled "System and Method for Reducing Effect of Negative Data in Crash Discrimination," and assigned to the assignee of the invention. For example, where the desired differential measure $m_1(t)$ is to be based on modified jerk, the absolute value of the lowest-ranked past acceleration value is preferably added to the lowest-ranked current acceleration value to obtain a first modified jerk value; the absolute value of the median-ranked past acceleration value is subtracted from the median-ranked current acceleration value to obtain a second modified jerk value; and the absolute value of the highest-ranked past acceleration value is added to the highest-ranked current acceleration value to obtain a third modified jerk value. The three modified jerk values are thereafter summed together to obtain a first preferred differential measure $m_1(t)$.

Alternatively, a first modified variance value is obtained by subtracting the absolute value of the lowest-ranked past acceleration value from the highest-ranked current acceleration value; and a second modified variance value is obtained by subtracting the absolute value of the lowest-ranked current acceleration value from the highest-ranked current acceleration value. These two modified variance values are thereafter summed to obtain a second preferred differential measure $m_1(t)$.

Along a parallel path, a measure $m_2(t)$ correlated with the relative progress of the event is generated from the received vehicle acceleration information a(t) at blocks 20, 22, 24, 26, 28 and 30. Broadly speaking, the progress measure is generated by "topping" the raw acceleration information whenever it exceeds a first predetermined threshold value $x_1$ in a manner which may be described as using a "floating clip" or "inverse constant damp;" weighting the resulting topped acceleration information by subtracting a first weighting factor therefrom; accumulating the thus-weighted topped acceleration information over time; and, preferably, scaling the resulting accumulated value using a suitable scaling factor. More specifically, if a transitory value for the received vehicle acceleration information a(t) is less than or equal to the first predetermined threshold value $x_1$, as determined at block 20, that very value is weighted by subtracting a first weighting factor $k_1$ therefrom at summing block 24 and then provided as the input to accumulator block 26. However, if a transitory value for the received vehicle acceleration information a(t) exceeds the first predetermined threshold value $x_1$, as determined at block 20 (whether the temporal slope of the received acceleration information a(t) is either positive or negative), an alternative value equal to twice the first predetermined threshold value $x_1$ minus that transitory value is generated at block 22, weighted by subtracting the first weighting factor $k_1$ therefrom at summing block 28 and then provided as the input to accumulator block 26. In this regard, it is noted that another way to generate the alternative value is to subtract from the first predetermined threshold value $x_1$ the amount by which the transitory value exceeds the first predetermined threshold value $x_1$. The output from accumulator block 28 is thereafter scaled with a scaling factor k at divider block 30. The output from divider block 30 is the desired progress measure $m_2(t)$.

The differential measure $m_1(t)$ is thereafter itself damped using the progress measure $m_2(t)$ and an additional constant "damping" or weighting factor $k_3$ at summing block 32, with the output of summing block 32 being accumulated at block 34 to obtain a measure $m_3(t)$ which is itself predictive of the severity of the event being analyzed with the instant system. The predictive measure $m_3(t)$ is thereafter compared to a second predetermined threshold value $x_2$ at block 36, with the safety device being actuated at block 38 when the predictive measure $m_3(t)$ exceeds the second predetermined threshold value $x_2$. In this regard, it is noted that the additional damping/weighting factor $k_3$ will tend to return the predictive measure $m_3(t)$ back to zero over time in the absence of significant values for the differential measure $m_1(t)$.

From the foregoing, it will be readily appreciated that the topping technique used in the calculation of the progress measure $m_2(t)$ differs substantively from known clipping methods in that the topped acceleration value still bears relation to the received acceleration information. Moreover, the first predetermined threshold value $x_1$ is preferably chosen so as to keep the progress measure $m_2(t)$ below a given maximum value: since the progress measure $m_2(t)$ is used to damp/weight the differential measure $m_1(t)$ prior to its accumulation at block 34, it is important that the progress measure $m_2(t)$ be limited so that the predictive measure $m_3(t)$ generated at block 34 remains useful in crash discrimination, i.e., is not otherwise so heavily damped as to become meaningless as a measure predictive of event severity.

And, upon the occurrence of a crash impulse which is short, high and fast, the alternate acceleration values generated at block 22 will quickly approach zero, with the resulting weighted input to the accumulating block 26 itself being a negative value tending likewise to reduce the progress measure $m_2(t)$ output from block 26 to near zero. The amount by which the differential measure $m_1(t)$ is damped at summing block 32 will thus be near zero to correlatively maximize the input to accumulating block 34 and, hence, the value of the predictive measure $m_3(t)$, thereby ensuring proper actuation of the safety device in response to that crash impulse. In this regard, it is noted that, since resonance is typically encountered "later" in a crash waveform, the progress measure $m_2(t)$ will by then have accumulated to a relatively great value and, hence, will appropriately heavily damp the likely-distorted transitory values for the differential measure $m_1(t)$.

While the preferred embodiment of the invention has been disclosed, it should be appreciated that the invention is susceptible of modification without departing from the spirit of the invention or the scope of the subjoined claims.

We claim:

1. In a method for controlling actuation of a vehicle passenger safety device in response to an event possibly requiring actuation of said safety device, said method including the steps of:

receiving information representative of instantaneous vehicle acceleration;

generating a measure which is evaluative of said received information in relation to time;

generating a measure correlated with the progress of said event based on said received acceleration information;

generating a measure predictive of the severity of said event based on said evaluative measure and said progress measure;

comparing said predictive measure with a first predetermined threshold value; and actuating said safety device if said predictive measure exceeds said first predetermined threshold value, the improvement wherein said step of generating said progress measure comprises the steps of:

selectively providing as an input to an accumulator a transitory value for said received information if the transitory value is less than or equal to a second predetermined threshold value, or an alternative value equal to twice said second predetermined threshold value minus the transitory value for said received information if the transitory value is greater than said second predetermined threshold value; and accumulating said selectively provided inputs in said accumulator.

2. The method of claim 1, wherein said step of generating said evaluative measure includes the steps of:

storing consecutive values for said received information in a storage means; and generating a differential measure from said stored values.

3. The method of claim 2, wherein said differential measure is a jerk value evaluative of the rate of change of said received acceleration information in relation to time.

4. The method of claim 2, further including the step of rank-ordering said stored values, and wherein said differential measure is a variance measure evaluative of the difference between two of said stored values having predetermined ranks.

5. The method of claim 1, including the further step of weighting said selectively provided inputs prior to said accumulating step by summing said selectively provided inputs with a first weighting factor.

6. The method of claim 1, including the further step of scaling said accumulated selectively provided inputs after said accumulating step by dividing said accumulated selectively provided inputs with a scaling factor.

7. The method of claim 1, wherein the step of generating said predictive measure includes the steps of:

combining said evaluative measure with said progress measure to obtain a combined measure; and accumulating said combined measure over time to obtain said predictive measure.

8. The method of claim 7, including the further step of weighting said combined measure prior to said accumulating step by summing said combined measure with a second weighting factor.

9. A system for controlling actuation of a vehicle passenger safety device in response to an event possibly requiring actuation of said safety device, said system comprising:

means for receiving information representative of instantaneous vehicle acceleration;

first generating means responsive to said received information for generating a measure evaluative of said received information in relation to time;

second generating means responsive to said received information for generating a measure correlated with the progress of said event, said second generating means including an accumulator, and means for selectively providing as an input to said accumulator a transitory value for said received information if the transitory value is less than or equal to a first predetermined threshold value, or an alternative value equal to twice said first predetermined threshold value minus the transitory value for said received information if the transitory value is greater than said first predetermined threshold value;

third generating means responsive to said evaluative measure and said progress measure for generating a measure predictive of crash severity;

first comparing means responsive to said predictive measure for generating an output signal if said predictive measure has exceeded a second predetermined threshold value; and actuating means responsive to said first comparing means for actuating said vehicle safety device upon generation of said output signal.

10. The system of claim 9, wherein said first generating means includes a means for storing a plurality of consecutive values for said received acceleration information, and a fourth generating means for generating a differential measure based on said stored values.

11. The system of claim 10, wherein said differential measure is a jerk value evaluative of the rate of change of said received acceleration information in relation to time.

12. The system of claim 10, wherein said first generating means further includes means for rank-ordering said stored values, and wherein said differential measure is a variance measure evaluative of the difference between two of said rank-ordered values having predetermined ranks.

13. The system of claim 9, wherein said second generating means further includes means for summing said selectively provided inputs with a first weighting factor prior to accumulating said selectively provided inputs in said first accumulator.

14. The system of claim 9, wherein said second generating means further includes means for scaling said accumulated selectively provided inputs from said first accumulator by dividing said accumulated selectively provided inputs with a scaling factor.

15. The system of claim 9, wherein said third generating means includes:

means for combining said evaluative measure with said progress measure to obtain a combined measure; and a second accumulator for accumulating said combined measure over time to obtain said predictive measure.

16. The system of claim 15, wherein said third generating means further includes means for weighting said combined measure prior to accumulation in said second accumulator by summing said combined measure with a second weighting factor.

* * * * *